United States Patent [19]
Wright

[11] Patent Number: 4,791,845
[45] Date of Patent: Dec. 20, 1988

[54] STRAIGHT LINE SHEAR

[75] Inventor: Douglas W. Wright, Tariffville, Conn.

[73] Assignee: Emhart Industries, Inc., Farmington, Conn.

[21] Appl. No.: 43,912

[22] Filed: Apr. 29, 1987

[51] Int. Cl.$^4$ ............................................. C03B 5/38
[52] U.S. Cl. ..................................... 83/150; 83/162; 83/623; 65/334
[58] Field of Search ............... 83/150, 162, 600, 623; 384/295, 296, 540; 65/133, 334, 332, 303

[56] References Cited
U.S. PATENT DOCUMENTS

| | | | |
|---|---|---|---|
| 2,997,350 | 8/1961 | Gerner | 384/295 |
| 3,579,319 | 5/1971 | Wythe et al. | 65/334 |
| 4,214,494 | 7/1980 | Dahms | 83/150 |
| 4,450,741 | 5/1984 | Mumford | 65/133 |

Primary Examiner—E. R. Kazenske
Assistant Examiner—Eugenia A. Jones
Attorney, Agent, or Firm—Spencer T. Smith

[57] ABSTRACT

A straight line shear has a pair of carriages which support opposed pairs of shear blade assemblies. These carriages are displaceable to shear gobs from molten runners of glass. Each shear blade assembly can be adjusted relative to its carriage, in the direction of carriage displacement, and to this end shear blade assembly guide pins are slidingly received in carriage bushings. These bushings have one axial portion which is press fit into a carriage bore and the remaining portion has an enlarged threaded interdiameter which extends the bushing and hence its life and which enables the bushing to be pulled from its bore by a hand tool having a threaded socket.

2 Claims, 1 Drawing Sheet

STRAIGHT LINE SHEAR

The present invention relates to straight line shears for cutting gobs from a continuously fed runner of molten glass.

In a straight line shear such as is disclosed in U.S. Pat. No. 4,214,494 opposed shear assemblies mounted on carriages are advanced in a straight line to cut the gobs. Each shear assembly has guide which is displaceable a shear and may have a drop with the shear. The drop guide can be adjusted by displacing it, relative to the shear, in the feed direction and by pivoting the drop guide about a vertical axis.

To permit the desired displacement of the drop guide in the feed direction the gob holder has a pair of guide pins which are slidingly received within uniformly dimensioned bushings press fit into carriage thru-bores. These bushings are prone to wear and difficult to replace.

It is accordingly an object of the present invention to provide an improved straight line shear wherein the guide pin bushings will have a longer life and will be easier to replace.

Other objects and advantages of the present invention will become apparent from the following position of the specification and from the accompanying drawings which illustrate, in accordance with the mandate of the patent statutes, a presently preferred embodiment incorporating the principle of the invention.

Referring to the drawings.

Figure 1:
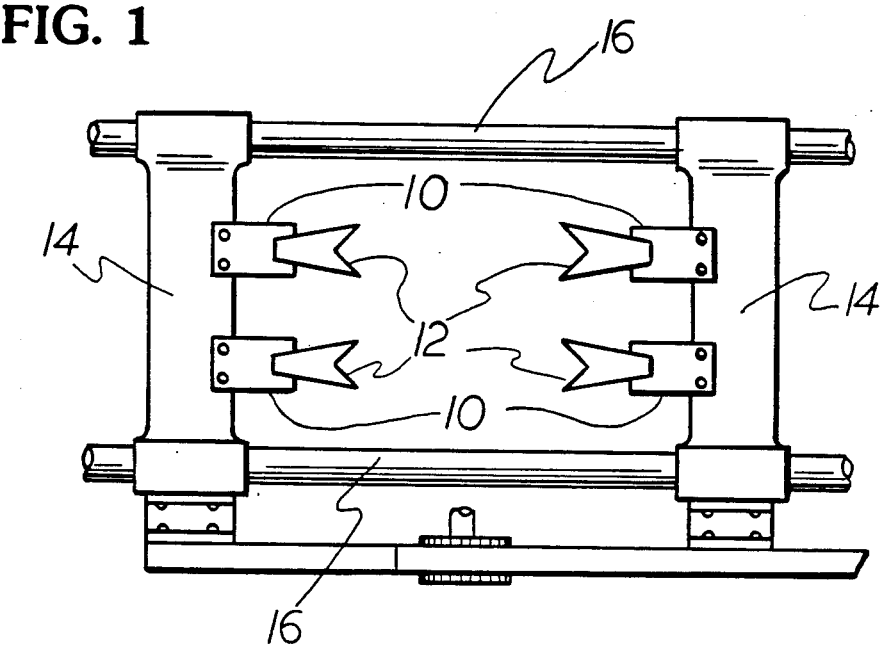
FIG. 1 is a top view of a portion of a straight line shear.

A straight line shear includes opposed pairs of shear heads 10, each having a shear blade 12, which are mounted on left and right carriage members 14. These carriage members 14 are displaceable, along side rails 16, to displace the shear blades 12 between remote and advanced locations. The shears on one side will wind up over the shears on the other side at the advanced position.

Figure 2:
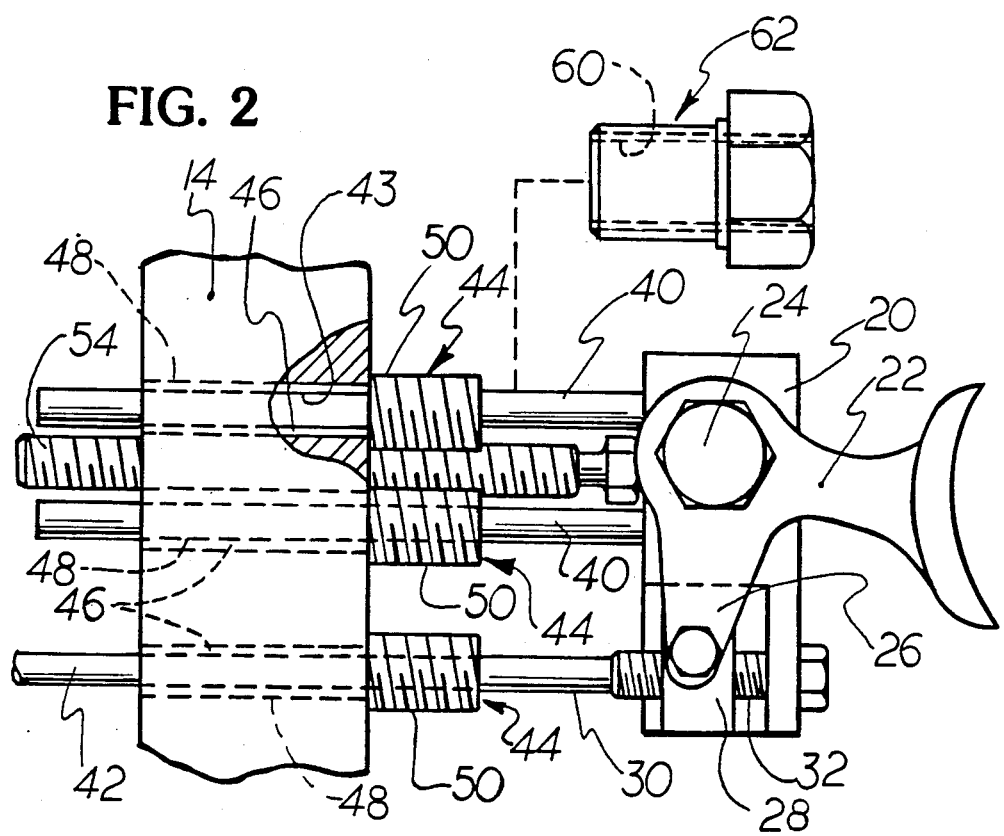
FIG. 2 is an enlarged top view of a drop guide assembly for the straight line shear illustrated in FIG. 1.

Sheared gobs of molten glass may follow a drop path that departs slightly from the desired vertical drop path. To guide such gobs to the gob distributor situated below (not shown) drop guide assemblies are usually used in conjunction with each of the upper shears. Referring to FIG. 2 the drop guide assembly of the present invention includes a drop guide holder 20 to which a drop guide 22 is mounted for pivotal displacement about the axis of the fastener 24 which secures the drop guide 22 to the drop guide holder 20. The lever arm 26 of the drop guide is secured to a threaded follower 28 and accordingly rotation of the adjusting shaft 30 having a threaded end 32 received by the threaded follower 28 will effect a readjustment of the drop guide about this axis.

Integral with the drop guide holder are a pair of cylindrical guide pins 40 which have a diameter equal to the cylindrical, non-threaded pin portion 42 of the adjusting shaft 30. The guide pins 40 and the pin portion 42 of the adjusting shaft 30 are received by thru-bores 43 of special bushings 44 which have a cylindrical portion 46 press fit into thru-bores 48 defined in the carriage 14. The remaining portion of these bushings has an enlarged threaded outer diameter 50. The gob holder can be displaced toward or away from the gob path by rotating the gob holder adjusting screw 54 which threadedly passes through the carriage.

The length of these bushings 44 is accordingly lengthened to improve their wear characteristics and the enlarged threaded bushing portions 50 permit easy withdrawal of these bushings by an internally threaded 60 socket 62 which can be driven by a suitable hand tool (not shown).

I claim:

1. A straight line shear comprising:
    a carriage supporting at least one shear blade assembly
    a drop guide assembly associated with each of said shear blade assemblies, said drop guide assembly including:
    a drop guide holder,
    a drop guide and
    cylindrical, smooth guide pin means secured to said drop guide holder,
    said carriage including thru-bores having bushing means having a cylindrical thru-bore for slidably receiving said cylindrical, smooth guide pin means, said bushing means having
    a cylindrical portion at one end adapted to be press fit into a carriage thru-bore and
    a remaining outer portion having an enlarged threaded diameter for receiving a threaded socket whereby the bushing means is extended and can be pulled from the thru-bore by a suitable hand tool.

2. A straight line shear according to claim 1 further comprising:
    means for changing the angular position of said drop guide including an adjusting shaft having a cylindrical portion, and said carriage further including a thru-bore having bushing means for receiving said cylindrical portion of said adjusting shaft, said bushing means for receiving said cylindrical portion of said adjusting shaft having
    a cylindrical portion at one end adapted to be press fit into said carriage thru-bore and
    a remaining outer portion having an enlarged threaded diameter for receiving a threaded socket whereby the bushing means is extended and can be pulled from the thru-bore by a suitable hand tool.

* * * * *